US007616943B2

(12) United States Patent
Oesterling

(10) Patent No.: US 7,616,943 B2
(45) Date of Patent: Nov. 10, 2009

(54) AUTOMATIC COMMUNICATION OF PERSONALIZED MESSAGES TO A TELEMATICS EQUIPPED VEHICLE

(75) Inventor: Christopher L. Oesterling, Troy, MI (US)

(73) Assignee: General Motors Company, Detroit, MI (US)

( * ) Notice: Subject to any disclaimer, the term of this patent is extended or adjusted under 35 U.S.C. 154(b) by 682 days.

(21) Appl. No.: 11/426,829

(22) Filed: Jun. 27, 2006

(65) Prior Publication Data

US 2007/0299565 A1 Dec. 27, 2007

(51) Int. Cl.
*H04M 1/725* (2006.01)

(52) U.S. Cl. .................................... 455/412.1; 455/403

(58) Field of Classification Search ....................... None
See application file for complete search history.

(56) References Cited

U.S. PATENT DOCUMENTS 6,084,870 A * 7/2000 Wooten et al. .............. 370/349
6,912,271 B1 * 6/2005 Tuttle .......................... 379/69
2006/0046649 A1 * 3/2006 Videtich .................... 455/12.1
2006/0100886 A1 * 5/2006 Simon ........................... 705/1
2006/0209174 A1 * 9/2006 Isaac et al. ............... 348/14.01
2007/0022173 A1 * 1/2007 Tamura et al. .............. 709/207

* cited by examiner

*Primary Examiner*—Ajit Patel
(74) *Attorney, Agent, or Firm*—Anthony Luke Simon; Reising Ethington P.C.

(57) ABSTRACT

A method of automatically communicating personalized messages to a telematics-equipped vehicle includes the following steps: (a) creating a personalized message; (b) defining playback instructions for playing the personalized message; (c) generating a trigger based on the defined playback instructions; (d) setting the trigger; (e) monitoring for the occurrence of one or more conditions that satisfy the trigger; and (f) determining that the one or more conditions have occurred and, if so, then; (g) accessing the personalized message associated with the trigger; and (h) playing the personalized message.

18 Claims, 2 Drawing Sheets

AUTOMATIC COMMUNICATION OF PERSONALIZED MESSAGES TO A TELEMATICS EQUIPPED VEHICLE

TECHNICAL FIELD

This invention relates to vehicle telematics systems and, more particularly, to communication of messages within a vehicle telematics system.

BACKGROUND OF THE INVENTION

In recent years, vehicle telematics systems have grown in popularity and are increasingly available in all types of vehicles. In general, vehicle telematics systems use a combination of various wireless voice and data telecommunications technologies to communicate between vehicles and data centers. Such communication enables a wide variety of services to be provided to subscribers of telematics services, including vehicle navigation, maintenance, diagnostics, advertising, emergency services, and messaging.

For example, pre-recorded messages can be broadcast by satellite to an entire fleet of vehicles to notify vehicle occupants of generalized information such as advertisements. But broadcast messages are not personalized in that they are not specifically tailored to any particular subscriber or occupant of a subscriber's vehicle. In another example, a human customer service representative can generate a particular message and transmit it to a telematics subscriber's vehicle by telephony. But generation and delivery of a particular message by a customer service representative may not always be cost effective or preferred.

SUMMARY OF THE INVENTION

According to one aspect of the present invention, there is provided a method of automatically communicating personalized messages to a telematics-equipped vehicle, comprising the steps of:

(a) creating a personalized message;

(b) defining playback instructions for playing the personalized message;

(c) generating a trigger based on the defined playback instructions;

(d) setting the trigger;

(e) monitoring for an occurrence of one or more conditions that satisfy the trigger; and (f) determining whether the one or more conditions have occurred and, if so, then:

(g) accessing the personalized message associated with the trigger; and (h) playing the personalized message.

The method may also include one or more of the following additional steps:

(i) entering an authentication key associated with a telematics service subscription; or (j) charging a fee.

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION OF THE PREFERRED EMBODIMENTS

Figure 1:
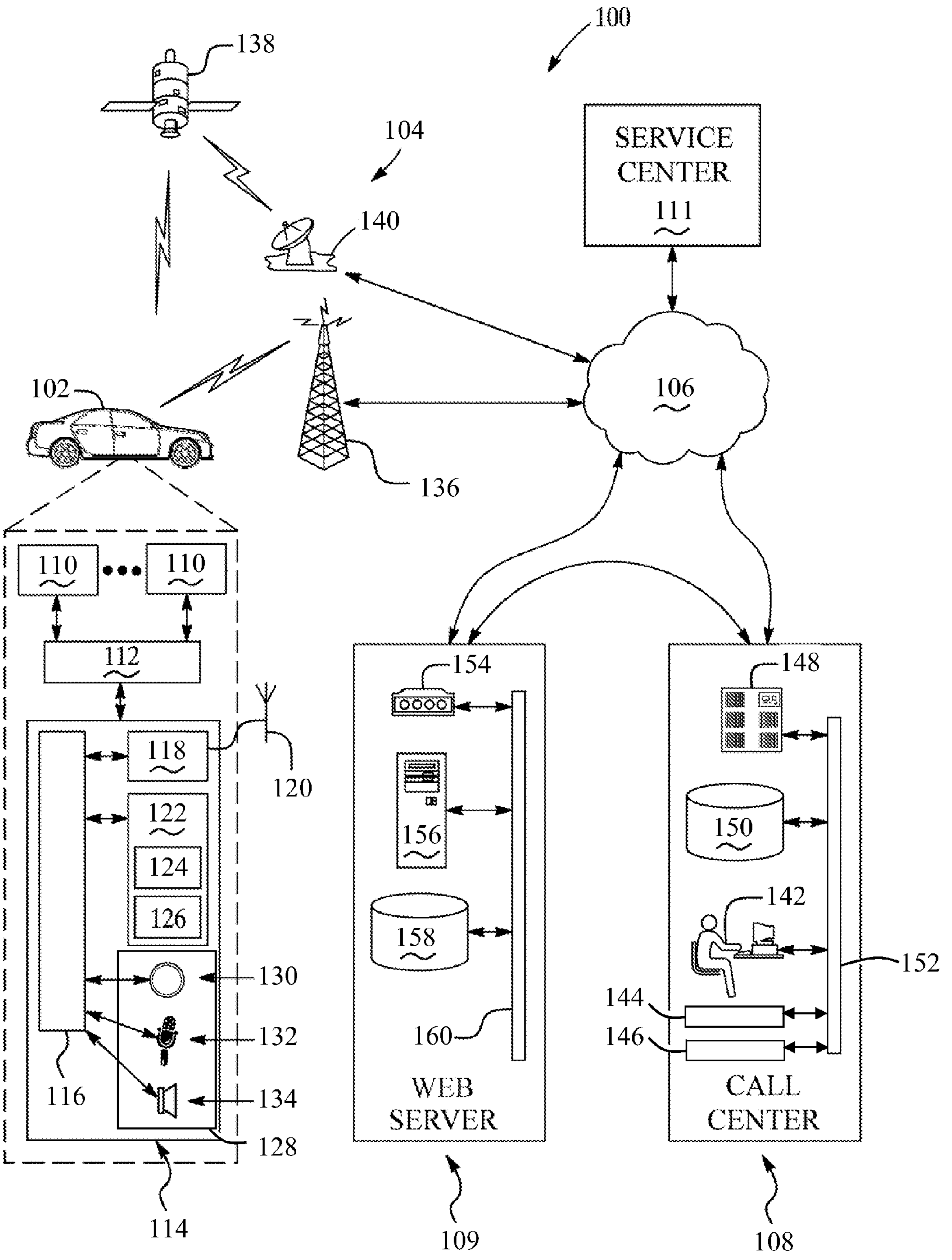
FIG. 1 is a block diagram depicting an example of a telematics system that can be used automatic communication of personalized messages to a telematics-equipped vehicle.

An exemplary operating environment is illustrated in FIG. 1, and can be used to implement the method shown in FIG. 2 and discussed below. The method can be particularly useful for automatically providing personalized messages in a telematics-equipped vehicle. The method can be carried out using any suitable telematics system. Preferably, however, the method is carried out in conjunction with a vehicle telematics system such as system 100. Those skilled in the art will appreciate that the overall architecture, as well as the individual elements of a system such as the system 100 shown here, are generally known in the art.

The system 100 can include a motor vehicle 102 carrying one or more occupants or users, a wireless communication system 104 for wirelessly communicating with the vehicle 102 and a second communications system 106 that, in turn, communicates with a call center 108 that provides services to the vehicle 102 by processing and storing data and communicating with the vehicle 102. Additionally, the telematics system 100 can also include a web server 109 in communication with the vehicle 102 and call center 108 for providing Internet services thereto, and a vehicle service center 111 in communication with and providing services to the vehicle 102.

The exemplary telematics system 100 generally facilitates one or more services to the occupant(s) of the vehicle 102, including vehicle navigation, turn-by-turn driving directions, telephony including automated audio interaction with vehicle occupants, emergency services, vehicle diagnostics, vehicle system updates, and automated speech recognition. For this purpose the telematics system 100 processes data and instructions as well as facilitates wireless voice and data transfer between hardware located on the vehicle 102 and hardware in the remote call center 108. For example, the telematics system 100 enables vehicle occupants to initiate voice communication, for example, with the call center 108 or the service center 111. Also, the telematics system 100 enables electronic communication between the vehicle 102 and the web server 109 for various purposes such as transmitting and/or receiving data such as updated voice messages, email, news, or the like.

Motor Vehicle

The motor vehicle 102 is depicted in the illustrated embodiment as a passenger vehicle, and it will be appreciated that any other vehicles including motorcycles, marine vehicles, aircraft, recreational vehicles, and other automobiles such as vans, trucks, etc., can be used without departing from the scope of the invention. Various electronic modules can be located on the vehicle 102 and include one or more vehicle sub-systems or vehicle system modules (VSMS) 110, an on-board vehicle communication bus 112, and one or more vehicle telematics units 114 connected by the bus 112 to the VSMs 110.

VSMs

The VSMs 110 facilitate suitable on-board functions such as vehicle diagnostics, monitoring, control, reporting, and/or other functions. For example, the VSMs 110 can be used for controlling engine operation, monitoring and deploying air bags or other safety devices, and/or diagnosing vehicle systems via various vehicle sensors. The VSMs 110 broadly represent any subsystems and/or components throughout the vehicle with which the telematics unit 114 interacts. In a specific example, if the call center 108 sends a signal to the vehicle 102 to unlock the vehicle doors, then the telematics unit 114 instructs a door lock VSM to unlock the doors.

Vehicle Communication Bus

The vehicle communication bus 112 facilitates interactions among the various vehicle systems such as the VSMs 110 and the telematics unit 114 and uses any suitable network communication configuration whether wired or wireless. A few examples include a Controller Area Network (CAN), Media Oriented System Transport (MOST), Local Interconnect Network (LIN), Ethernet (10baseT, 100baseT), Local Area Network (LAN), ISO Standard 9141, ISO Standard 11898 for high-speed applications, ISO Standard 11519 for lower speed applications, SAE Standard J1850 for high-speed and lower speed applications, and/or a wireless area network.

Vehicle Telematics Unit

The vehicle telematics unit 114 facilitates communication and interactivity between the vehicle 102 or occupants thereof, and various remote locations including the call center 108, web server 109, and/or and service center 111. The telematics unit 114 interfaces with the various VSM's 110 via the vehicle communication bus 112. The telematics unit 114 can be implemented in any suitable configuration and preferably includes a processor 116, a communications device 118 for wireless communication to and from the vehicle 102 via one or more antennas 120, a memory 122 to store programs 124 and/or one or more databases 126, and a user interface 128. The telematics unit 114 also includes any suitable device for intercommunicating the aforementioned devices.

The communications device 118 may include any suitable technology(ies) including a satellite receiver, a cellular chipset for voice communications, a modem for data communications, etc. Also, those skilled in the art recognized that the modem can transmit and receive data over a voice channel by applying some type of encoding or modulation to convert digital data for communication through a vocoder or speech codec incorporated in a cellular chipset. Any suitable encoding or modulation technique that provides an acceptable data rate and bit error rate can be used. For a more complete discussion of an example of data transmission over a voice channel, please refer to U.S. patent application Ser. No. 11/163,579 filed Oct. 24, 2005, which is assigned to the present assignee and is hereby incorporated by reference in its entirety.

Telematics Processor

The telematics processor 116 is implemented in any of various ways known to those skilled in the art, such as in the form of a controller, microprocessor, microcontroller, host processor, vehicle communications processor, Application Specific Integrated Circuit (ASIC), or as any other appropriate processor type. Alternatively, the processor 116 can work in conjunction with a central processing unit (not shown) performing the function of a general purpose computer. The processor 116 can be associated with other suitable devices (not shown) such as a real time clock to provide accurate date and time information. The processor 116 executes the one or more computer programs 124 stored in memory 122, such as to carry out various functions of monitoring and processing data and communicating the telematics unit 114 with the VSM's 110, vehicle occupants, and remote locations. For example, the processor 116 can execute one or more control programs and processes trigger and/or message programs and/or data to carry out a method of automatically providing personalized messages, either alone or in conjunction with the call center 108. Further, the processor 116 controls, generates, and accepts signals transmitted between the telematics unit 114 and call center 108 via the communications systems 104, 106, and between the telematics unit 114 and the vehicle communication bus 112 that is connected to the various mechanical and/or electronic VSM's 110. In one mode, these signals are used to activate programming and operation modes of the VSM's 110.

Telematics Memory

The telematics memory 122 can be any electronic storage device that provides computer-readable storage of data and programs for use by the processor 116. The memory 122 can include volatile, and/or non-volatile memory storage, such as RAM, NVRAM, hard disks, flash memory, etc., and can be implemented as one or more separate physical devices. The programs 124 include one or more computer programs that are executed by the processor 116 to carry out the various functions of the telematics unit 114. For example, the software or programs 124 resident in the memory 122 and executed by the processor 116 can be used for carrying out a method of automatically providing personalized messages. The database 126 can be used to store message data, diagnostic trouble code data or other diagnostic data, vehicle data upload (VDU) records, event activation tables, etc. For example, the database 126 can include voice or test messages, triggers, etc. This database 126 can be implemented as database tables that enable lookups to be performed on data stored in the database 126, and this can be done using known indexing techniques and/or database queries, or by straight serial searching through such tables. These and other database storage and lookup techniques are well known to those skilled in the art.

Telematics Communications Device

The telematics communications device 118 provides wireless communication via cellular, satellite, or other wireless path, and facilitates both voice and data communications. For example, the wireless telematics communications device 118 and associated antenna 120 transmits and receives voice and data to and from the wireless communication system 104 so that the telematics unit 114 can communicate with the call center 108 via the second communication system 106. Accordingly, the wireless communications device 118 is preferably equipped with cellular communications software and hardware such as a wireless modem or embedded cellular telephone, which can be analog, digital, dual mode, dual band, multi mode, and/or multi-band, and can include a separate processor and memory. Also, the wireless communications device 118 preferably uses cellular technology such as Advanced Mobile Phone System (AMPS), code division multiple access (CDMA), time division multiple access (TDMA), Global System for Mobile communications (GSM), etc. but could also utilize proprietary or other wireless technologies to communicate with the wireless communication system 104.

The communications device 118 can also include global positioning system (GPS) communication and signal processing software and equipment, which can be separate from or integrated with the communications device 118. For example, such a GPS receiver receives location and time data from the wireless communication system 104 and conveys corresponding latitude and longitude information to the telematics unit 114 to enable the telematics unit 114 to process, store, and send location information to carry out services such as navigation, driving directions, and emergency services.

The communications device 118 can further include satellite communications signal processing software and equipment, which can be separate from or integrated with the communications device 118. The satellite communications module receives satellite radio broadcast signals from, for example, a geostationary satellite. The satellite radio module may receive broadcast radio information over one or more channels and generate an audio output or provide data communications from a satellite service provider. In addition to music and entertainment, traffic information, road construction information, advertisements, news and information on local events, satellite broadcasts may include messages. Satellite radio broadcast signals received by the satellite radio receiver can be monitored for signals with targeted information, and when the targeted information is detected, the targeted message and associated information can be extracted from the broadcast signal.

Telematics User Interface

The telematics user interface 128 includes one or more input and output modules and/or devices to receive input from, and transmit output to, a vehicle occupant. As used herein, the term interface broadly means any suitable form of electronic device or adapter, or even a software module or adapter, which enables a user or a piece of equipment to communicate with or control another piece of equipment. The interface described herein can be a single interface or can be implemented as separate interfaces or any combination thereof.

The input devices include one or more of the following devices: one or more tactile devices 130 such as one or more pushbutton switches, keypads, or keyboards; one or more microphones 132; or any other type of input device. The tactile input device 130 enables user-activation of one or more functions of the telematics unit 114 and can include a pushbutton switch, keypad, keyboard, or other suitable input device located within the vehicle in reach of the vehicle occupants. For example, the tactile input device 130 can be used to initiate telecommunications with remote locations, such as the call center 108 or cellular telephones and/or to initiate vehicle updates, diagnostics, or the like. The microphone 132 allows vehicle occupants to provide voice commands or other verbal input into the telematics unit 114, as well as voice communication with various remote locations via the communications device 122. Voice commands from the vehicle occupants can be interpreted using a suitable analog-to-digital interface or digital signal processor such as a sound card (not shown) between the microphone 132 and the processor 116 and voice recognition programs and data stored within the memory 122.

The output devices can include one or more speakers 134, a visual display device such as a liquid crystal or plasma screen (not shown), or any other types of output devices. The speaker(s) 134 enable the telematics unit 114 to communicate with the vehicle occupants through audible speech, signals, or audio files, and can be stand-alone speakers specifically dedicated for use with the telematics unit 114, or they can be part of a vehicle audio system. A suitable interface device such as a sound card (not shown) can be interposed between the speakers 134 and the telematics processor 116.

Although depicted in FIG. 1 as separate individual modules, it will be appreciated by those skilled in the art that many of the components of the telematics unit 114 can be integrated together, or integrated and/or shared with other vehicle systems. For example, the memory 122 can be incorporated into the processor 116 or located outside of telematics unit 114 and shared with one or more other vehicle systems such as a vehicle central processing unit. Although the VSM's 110 are shown separate from the telematics unit 114, it is possible for any combination of these VSM's 110 to be integrated within the telematics unit 114. Furthermore, the telematics unit 114 could include additional components not shown here, or could omit some of the components shown here.

Communication System(s)

The wireless communication system 104 can include an analog or digital cellular network 136, a wireless computer network such as a wide area network (not shown), wireless local area network, broadband wireless network, or any other suitable wireless network used to transmit voice and/or data signals between the vehicle 102 and various remote locations such as the call center 108 and/or service center 111. In one embodiment, the cellular network 136 is implemented as a CDMA, GSM, or other cellular communication network that enables exchange of voice and data between the vehicle 102 and the second communication system 106.

Additionally or alternatively, wireless communication can be carried out by satellite transmission using one or more satellites 138 to connect the vehicle 102 to the second communication system 106 via a central, ground-based satellite transceiver 140. As an exemplary implementation, the satellite transceiver 140 and satellite(s) 138 can transmit radio signals to the vehicle 102. As one example, a satellite transmission can be broadcast over a spectrum in the "S" band that has been allocated by the U.S. Federal Communication Commission for national broadcasting of satellite-based Digital Audio Radio Service (DARS). More specifically, satellite transmission can be carried out using XM™ brand satellite radio services.

The second communication system 106 can be another wireless communication system or can be a land-based wired system such as a public switched telephone network (PTSN), Internet Protocol (IP) network, optical network, fiber network, cable network, utility power transmission lines, and/or any combination of the aforementioned examples, any of which can be used for voice and/or data communication. Those skilled in the art will recognize that the communication systems 104, 106 can be implemented separately or can be combined as an integral system.

Call Center

The call center 108 can be a data center, and can include one or more locations and can be automated and/or staffed by advisors 142 to handle calls from vehicle occupants and/or to monitor various vehicle conditions such as an airbag deployment. The call center 108 includes one or more voice and/or data interfaces 144 such as modems, switches, and/or routers, to transmit and receive voice and/or data signals by vehicle data uploads (VDU) between the vehicle telematics unit 114 and the call center 108 through the communications systems 104, 106. The call center 108 also includes one or more communication service managers 146, one or more servers 148 to process data, one or more suitable databases 150 to store subscriber data and any other suitable data, and one or more networks 152 such as a LAN for connecting the call center components together along with the any computer(s) used by the one or more advisors 142. For example, the servers 148 and databases 150 execute and store one or more control programs and trigger and/or message data to carry out a method of automatically providing personalized messages, either alone or in conjunction with the telematics unit 114 of the vehicle 102. Suitable call center facilities are known and currently in use to provide remote assistance by human advisors in connection with in-vehicle safety and security systems. Apart from using human advisors, the advisors 142 can be implemented as automatons or programs running on a computer operatively disposed to respond to subscriber requests.

Web Server

The integration of the web server 109 with the system 100 enables vehicle occupants to access websites and other content over the Internet, all from the vehicle using automated speech recognition technology and text-to-voice technology such as VoiceXML, or the like. For example, vehicle occupants can use the telematics unit 114 and embedded speech recognition to ask for information, such as by vocalizing a command like "weather" or by speaking a nametag associated with a particular website address. The speech recognition technology recognizes the command or nametag and translates the request into suitable web language such as XML (Extensible Markup Language) and/or associate the request with a stored user profile, which correlates the request to a specific website. The web server 109 interprets the request, accesses and retrieves suitable information from the website according to the request, and translates the information into VoiceXML and then transmits a corresponding voice data file to the vehicle 102 where it is processed through the telematics unit 114 and output to the occupants via the user interface 128.

The web server 109 is implemented using one or more computer servers located either at an independent remote location or, for example, at the call center 108. If desired, the web server 109 can be integrated into the call center 108 rather than utilizing two separate systems. The exemplary server 109 includes a suitable communication interface 154 such as a modem, switch, and/or router, a computer 156, and a database 158 all connected by a suitable network 160 such as an Ethernet LAN. The database 158 can be implemented using a separate network attached storage (NAS) device or can be stored on the computer 156 itself, or can be located elsewhere, as desired. The computer 156 has a server application program that controls the exchange of data between the vehicle 102 and the database 158 via the communication systems 104, 106. The web server 109 also communicates with the call center 108 and/or the service center 111 either via the second communication system 106 or by some more direct path. Suitable server hardware and software configurations are known to those skilled in the art.

Service Center

The service center 111 can be a vehicle service center such as a dealership where vehicle maintenance and repair is carried out. The service center 111 is connected by the communication systems 104, 106 with the vehicle 102 so that, for example, vehicle occupants can initiate a telephone call with a technician or service scheduler at the service center 111.

Method Of Automatically Providing Personalized Messages

Figure 2:
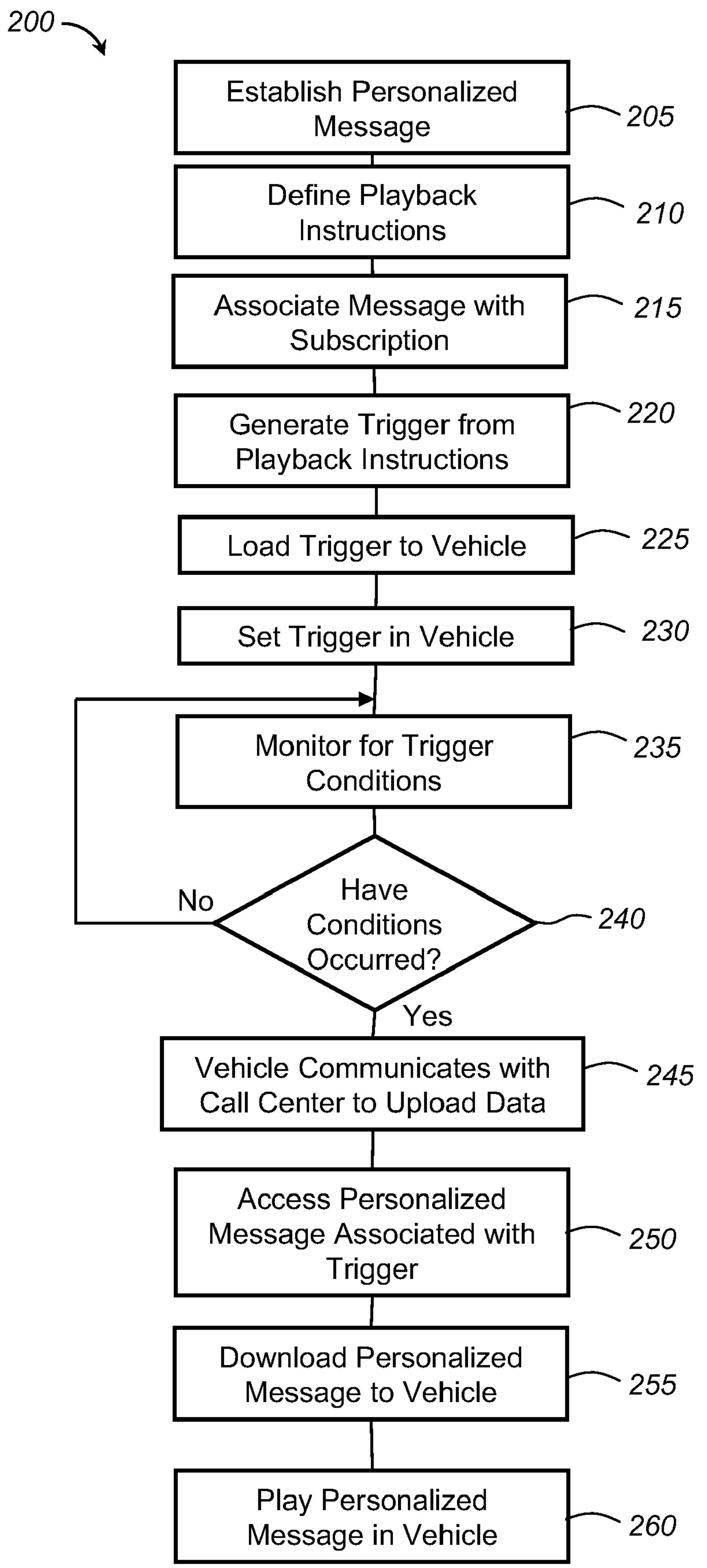
FIG. 2 is a flow chart of an embodiment of an exemplary method of automatically communicating personalized messages to a telematics-equipped vehicle that can be performed using the telematics system of FIG. 1.

Referring now to FIG. 2, a method 200 of automatically communicating personalized messages to a telematics-equipped vehicle is provided herein and can be carried out as one or more computer programs within the operating environment of the telematics system 100 described above. More specifically, the method 200 can be carried out using either or both of the vehicle telematics unit 114 and call center 108, and using the communications system 104, 106. Those skilled in the art will also recognize that the method can be carried out using other systems within other operating environments.

In general, the method 200 is provided to automatically communicate personalized information in a vehicle based on an occurrence of a specific condition identified by a message sender as a playback instruction. In other words, messages can be automatically provided to the vehicle and are personalized because the messages are intended for and tailored to some individual subscriber and/or vehicle occupant(s). Exemplary personalized conditions and instructions can be based on or include one or more of the following events: a birthday, an anniversary, arrival to or departure from a geographical location or region, or the like. Any other suitable conditions or instructions can also be used in the method 200. Accordingly, in contrast to general information that is broadcast to multitudes of vehicles for general consumption, personalized messages can be communicated to a particular vehicle, as will be further detailed below.

In step 205, personalized messages are created. A personalized message is a communication of personalized information in audible, textual, or other suitable form. The personalized message can be communicated within a vehicle using audio and/or text messages that can be loaded to the vehicle in any suitable manner. The personalized message can be, but need not be in a passive format wherein the personalized message is played without active involvement from vehicle occupants. In other words, where passive activation is desired vehicle occupants do not have to affirmatively act to receive the personalized message. Active initiation of the message can instead be used, such as by accessing e-mail, tuning in to a satellite broadcast, or answering a phone call or the like.

Personalized messages can be established by a message sender, who can be anyone who desires to play a message in a subscriber vehicle and who has authorization to send the personalized message. The personalized message sender can be authorized to send messages, for example, if the personalized message sender knows a subscriber name and a proper authentication key associated with a telematics service subscription. The authentication key can be defined by a subscriber and can include, for example, a personal identification number associated with a subscriber, or a vehicle identification number associated with the subscriber's vehicle, or any other suitable authentication keys or means of personal identification. In this way, the subscriber can control who can create and send messages on the subscriber's telematics subscription. In another example, a list of eligible message senders may be maintained in a subscriber profile hosted at call center 108, such as in one or more suitable databases 150. In yet another example, the list of eligible message senders may be maintained in one or more components of telematics unit 114, like memory 124 and/or databases 126.

The personalized message sender can establish the personalized message to be sent using any suitable means, including using the Internet, a telematics equipped vehicle, a telephone, or the like. In one example, the personalized message sender can access a telematics services website via a computing device linked to the telematics system, such as to the call center and/or web server. The computing device can be linked to the telematics system in any suitable manner such as by the Internet, by wireless connection, or the like. The telematics services website can include a webpage where a message sender can enter an authentication key and create a message such as a birthday song. The authentication key can be an alphanumeric code, or the like that a subscriber can give to friends and family. The personalized message receiver can be a telematics service subscriber, a subscriber's vehicle, an occupant of a subscriber's vehicle, or the like. The message can be created by typing it such as for text-to-speech conversion, vocalizing it, or attaching a message file to a webpage transmission, or the like.

In another example, the message sender can create the message in a subscriber's vehicle using, for example, a vehicle's telematics system. In general, the message sender can use a vehicle telematics user interface to create the message and define playback instructions. More specifically, the message sender can use the telematics microphone to record a voice message, and can use the telematics tactile device or the microphone to define playback instructions. The message and the instructions can be stored in vehicle memory or in memory at the call center. The vehicle being used to create the message can be the vehicle in which the message is to be played, or can be any other vehicle that subscribes to the telematics services of the telematics system.

In still another example, the message sender can create the message using a telephone. More specifically, the message sender can call an automated messaging service at the call center, wherein messages can be created using an audio menu and touch tone telephone input.

No matter how the message is created or from where, it can be manifested in the form of a computer file and can be stored in memory on a telematics vehicle or telematics call center or the like. For example, the message can be saved as a voice message in acoustic data format such as a *.wav file, or a text message or text-to-voice message such as a VoiceXML file, or any other suitable format.

In step 210, the message sender can define playback instructions according to which the personalized message is to be played in the vehicle. Exemplary playback instructions can include time-related instructions such as a birth date, anniversary, holiday, or the like. For example, a particular subscriber's birth date can be associated with an audio birthday greeting like a voice message including the Happy Birthday song, a subscriber's anniversary date can be associated with a voice or text message including a poem, or a holiday can be associated with a text message quote of scripture.

Another exemplary playback instruction can include geographical instructions. Exemplary geographical instructions can include arrival of a telematics equipped vehicle to a geographical location or region, or departure from a geographical location or region, or the like.

A further exemplary playback instruction can include instructions based on a particular telematics services user. A telematics services user can include a subscriber who subscribes to telematics services via a telematics service subscription, or a person associated with a telematics service subscription by the subscriber, or the like. In one implementation, an exemplary instruction can include playing a message for a particular user based on, for example, recognition of a particular occupant's key fob, recognition of a particular occupant's voice, or the like. Accordingly, a personalized message can be associated with a particular telematics services user rather than a particular subscriber vehicle, or a combination of a particular user and one or more specific telematics subscriber vehicles.

The personalized message sender can define the instructions using any suitable means, including using the Internet, a telematics equipped vehicle, a telephone, or the like, as previously described with respect to step 205. No matter how the instructions are created or from where, they can be manifested in the form of a computer file and can be stored in memory on a telematics vehicle or telematics call center or the like. For example, the instructions can be stored as an individual computer file, or as data included in a computer file for the message, or the like. In defining the instructions, the personalized message sender can define a date and time for the personalized message to be played, and/or precisely when the personalized message should be played such as upon vehicle ignition on the defined date, or the like.

Once the message is created and playback instructions defined, the message and instructions can be sent to the call center and/or web server. For example, the message and instructions can be sent automatically once the message and playback instructions are complete, or can be sent after the message sender manually confirms, such as with a click of a send button of a webpage, or the like.

In step 215, at the web server and/or call center, the message and its playback instructions can be received and associated with a particular vehicle of a given subscription, a particular subscriber, a particular user associated with a subscription, or the like. This can be done, for example, using a database lookup where the playback instructions communicated from the message sender is used as input to look up and return the vehicle(s), subscriber, user, or the like associated with those instructions.

In step 220, triggers are generated. More specifically, one or more triggers are generated for monitoring personalized conditions corresponding to the playback instructions. In other words, personalized conditions can be tracked using triggers that can be loaded to the vehicle. A trigger includes one or more pre-defined conditions that correspond to the playback instructions and, when met, enable initiation of some further action. There can be many different types of triggers; too many to list them all. But exemplary triggers can generally include time-related triggers such as birthday triggers, anniversary triggers, holiday triggers, or the like, as well as geographical triggers. Exemplary geographical triggers can include arrival of a telematics equipped vehicle to a geographical location or region, or departure from a geographical location or region, or the like. Those skilled in the art will recognize that a trigger can be defined for just about any playback instructions and corresponding personalized condition(s).

A trigger can be manifested in the form of a computer file, such as a computer program file or a portion thereof like an algorithm, pseudo code or conditional logic, or in the form of a computer data file for use by another program. Use of triggers can be facilitated by known vehicle data upload (VDU) techniques. Exemplary VDU techniques are described in U.S. Patent Application Publications 2004/0259524, 2004/0054444, and 2004/0203696, which are all assigned to the present assignee and hereby incorporated by reference in their entireties.

In step 225, a trigger and/or associated personalized message can be loaded to a telematics-equipped vehicle. Triggers and personalized messages can be loaded to the vehicle from the call center in any suitable fashion including using the communications system. The triggers and personalized messages can be loaded to any appropriate vehicle computing device or the like, such as the vehicle telematics unit where the triggers and personalized messages can be stored in memory.

In step 230, a trigger can be set. The trigger can be set in any suitable location such as the call center, or the vehicle. In one example, the trigger is automatically set in the vehicle, such as when it is downloaded in step 225 from the call center to the vehicle. In another example, some triggers can be dormant in that they are already loaded to the vehicle and stored in vehicle memory but are not yet activated. Such triggers can be set by receiving an instruction from the call center.

In step 235, an occurrence of one or more conditions that satisfy a trigger can be monitored. Any of various vehicle systems, such as the VSM's, and related sensors can be used to monitor vehicle conditions covered by a set trigger. For example, a vehicle clocking device can be used to monitor a date and time signal. That signal can be used in monitoring for a time-related trigger, such as a birthday trigger. In another example, a vehicle entry VSM or vehicle ignition VSM can monitor for the presence of a key fob associated with a particular vehicle user or occupant. In a further example, a vehicle automated speech recognition VSM can monitor for the presence of a particular occupant by recognizing the voice of the occupant.

Moreover, triggers can be set in the vehicle and all monitoring for the occurrence of a related event can take place in the vehicle. However, it will be appreciated by those skilled in the art that at least some triggers can be monitored at the call center and then a call placed to the vehicle to obtain the data associated with the trigger. In other words, the monitoring can be carried out in any suitable location by any suitable computing device that processes a trigger computer file, such as a trigger program file or other suitable program file using a trigger data file, or using any other suitable arrangement.

In step 240, it is determined whether the condition(s) defined by the trigger have occurred. For example, if a clock signal is received that indicates that a birth date has occurred, then the trigger can initiate a messaging sequence wherein a message associated with the trigger is communicated to the vehicle. In another example, if a key fob signal associated with a particular user is received, then the trigger can initiate a messaging sequence. In one implementation, a computer program, routine, or algorithm can be executed by a vehicle computing device such as the telematics processor and used in conjunction with signals received by suitable vehicle systems and/or sensors to determine if the one or more trigger conditions have been satisfied. If the condition(s) defined by the trigger have not occurred, then the process loops back to step 235.

If, however, the condition(s) defined by the trigger have occurred, then a messaging sequence is triggered. The messaging sequence can include accessing memory of a vehicle computing device to retrieve a previously stored computer file containing the associated personalized message, and processing the computer file to communicate the personalized message to the vehicle. The messaging sequence can also or instead include steps 245 through 255 below.

In step 245, the vehicle can communicate with the call center. More specifically, the trigger can initiate a communication session between the vehicle and the call center to upload data associated with the trigger from the vehicle, in response to an affirmative determination from the determining step 240. For example, if the trigger was a birthday trigger, then the trigger event data can include any suitable data indicating that the birth date has arrived, or simply that the birthday trigger was met. The communication or call can be carried out using the telematics communication system. This step can be carried out using VDU protocol or any other suitable data transfer protocol(s).

In step 250, the personalized message associated with the uploaded trigger data can be accessed from memory in the call center. This can be done, for example, using a lookup table in memory where the particular type of trigger communicated from the vehicle is used as input to look up and return the message associated with that trigger.

In step 255, the personalized message accessed from call center memory can be downloaded to the vehicle. The personalized message can be downloaded to the vehicle in any suitable fashion, including using any or all of the communication system. For example, the call center may use any suitable data transfer protocol such as short messaging service (SMS), GSM, CDMA, AMPS, etc. In another example, the personalized message can be sent by satellite transmission using any suitable satellite transmission protocol. For a more complete discussion of an example of messaging using satellite transmission, please refer to U.S. Patent Publication 2006/0046649, which is assigned to the present assignee and is hereby incorporated by reference in its entirety.

In step 260, the personalized message can be played so that it is seen and/or heard in the vehicle. For example, a computer file, such as a program or data file, containing the personalized message can be executed or otherwise processed by any suitable vehicle processor, such as the telematics processor. Accordingly, an audio or text message can be presented to a vehicle occupant. For example, a text message can be presented on an in-vehicle display such as a computer monitor, GPS navigation screen, vehicle radio display, driver information display, or any other suitable visual output device. Also, an audio message can be presented via vehicle radio speakers, telematics speakers, or any other suitable audible output device.

Finally, a fee can be charged for use of the personalized messaging service. For example, the message sender can be charged a per use fee, such as for using an Internet webpage to create and send the personalized message. Fee based website services are generally known to those skilled in the art. In another example, the subscriber can be charged a per use fee whenever a message is retrieved for, sent to, or played in, one of the subscriber's vehicles. For instance, at step 245, when the call center receives a call from the vehicle to communicate the trigger results, a subscriber's telematics subscription account can be charged a fee automatically. In another instance, upon completion of step 260, a confirmation call can automatically be placed from the vehicle to the call center to confirm that the message has been played and to automatically charge the subscriber's telematics subscription account. In yet another example, the subscriber can be charged telematics system airtime whenever a message is sent to one of the subscriber's vehicles from the call center.

It is to be understood that the foregoing description is not a definition of the invention itself, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example" and "such as," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method of automatically communicating personalized messages to a telematics-equipped vehicle, comprising the steps of:

(a) creating a personalized message;

(b) defining playback instructions for playing the personalized message;

(c) generating a trigger based on the defined playback instructions;

(d) setting the trigger;

(e) monitoring for occurrence of one or more conditions that satisfy the trigger; and (f) determining whether the one or more conditions have occurred and, if so, then:

(g) accessing the personalized message associated with the trigger; and (h) playing the personalized message.

2. The method of claim 1, further comprising the step of entering an authentication key associated with a telematics service subscription.

3. The method of claim 2, wherein the authentication key includes at least one of a personal identification number or a vehicle identification number.

4. The method of claim 1, wherein the creating step comprises using at least one of an Internet web site, a telephone, or a vehicle telematics unit to create the personalized message.

5. The method of claim 1, further comprising the step of charging a fee.

6. The method of claim 5, wherein the charging step comprises charging a per use fee whenever a message is retrieved for, sent to, or played in, one of the subscriber's vehicles.

7. The method of claim 5, wherein the charging step comprises charging an airtime fee whenever a message is sent to one of the subscriber's vehicles from a call center.

8. The method of claim 5, wherein the charging step comprises charging a message sender a per use fee to create the personalized message.

9. The method of claim 1, wherein the playback instructions include instructions based on a telematics services user.

10. The method of claim 9, wherein the monitoring step includes recognizing at least one of a key fob associated with, or a voice of, the telematics services user.

11. A method of automatically communicating personalized messages to a telematics-equipped vehicle, comprising the steps of:

(a) charging a fee;

(b) entering an authentication key associated with a telematics service subscription;

(c) creating a personalized message;

(d) defining playback instructions for playing the personalized message;

(e) generating a trigger based on the defined playback instructions;

(f) downloading the trigger and the personalized message to the vehicle from the call center;

(g) setting the trigger in the vehicle;

(h) monitoring for occurrence of one or more conditions that satisfy the trigger; and (i) determining whether the one or more conditions have occurred and, if so, then:

(j) playing the personalized message.

12. The method of claim 11, wherein the charging step comprises charging a per use fee whenever a message is retrieved for, sent to, or played in, one of the subscriber's vehicles.

13. The method of claim 11, wherein the charging step comprises charging an airtime fee whenever a message is sent to one of the subscriber's vehicles from a call center.

14. The method of claim 11, wherein the charging step comprises charging a message sender a per use fee to create the personalized message.

15. The method of claim 11, wherein the authentication key includes at least one of a personal identification number or a vehicle identification number.

16. The method of claim 11, wherein the playback instructions include instructions based on a telematics services user.

17. The method of claim 16, wherein the monitoring step includes recognizing at least one of a key fob associated with, or a voice of, the telematics services user.

18. A method of automatically communicating personalized messages to a telematics-equipped vehicle, comprising the steps of:

(a) entering an authentication key associated with a telematics service subscription, wherein the authentication key includes at least one of a personal identification number or a vehicle identification number;

(b) creating a personalized message using at least one of an Internet web site, a telephone, or a vehicle telematics unit;

(c) generating a trigger based on the defined playback instructions;

(d) defining playback instructions for playing the personalized message;

(e) storing the personalized message in a call center;

(f) downloading the trigger and to the vehicle from the call center;

(g) setting the trigger in the vehicle;

(h) monitoring for occurrence of one or more conditions that satisfy the trigger; and (i) determining whether the one or more conditions have occurred and, if so, then:

(j) uploading data associated with the trigger from the vehicle to the call center in response to the determining step;

(k) accessing the personalized message associated with the trigger from memory in the call center;

(l) downloading the personalized message from the call center to the vehicle; and (m) playing the personalized message in the vehicle.

* * * * *